(12) United States Patent
Nakamura et al.

(10) Patent No.: US 9,696,945 B2
(45) Date of Patent: Jul. 4, 2017

(54) PRINT APPARATUS AND PRINT SYSTEM THAT REPORTS THE SITUATION OF THE PRINT APPARATUS

(71) Applicant: Konica Minolta, Inc., Tokyo (JP)

(72) Inventors: Masatoshi Nakamura, Kanagawa (JP); Tomokazu Kato, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/832,657

(22) Filed: Aug. 21, 2015

(65) Prior Publication Data

US 2016/0054959 A1 Feb. 25, 2016

(30) Foreign Application Priority Data

Aug. 21, 2014 (JP) .................................. 2014-168763

(51) Int. Cl.
*G06F 3/12* (2006.01)
(52) U.S. Cl.
CPC ............ *G06F 3/1207* (2013.01); *G06F 3/122* (2013.01); *G06F 3/1229* (2013.01); *G06F 3/1259* (2013.01); *G06F 3/1288* (2013.01)
(58) Field of Classification Search
None
See application file for complete search history.

(56) References Cited

U.S. PATENT DOCUMENTS

| 7,505,159 B2 * | 3/2009 | Ohara ................... G06F 3/1207 358/1.15 |
| 2003/0084044 A1 * | 5/2003 | Simpson ................. H04L 29/06 |
| 2003/0172148 A1 * | 9/2003 | Simpson ................. G06F 3/121 709/224 |

FOREIGN PATENT DOCUMENTS

| JP | 2000-341504 A | 12/2000 |
| JP | 2003-280867 A | 10/2003 |
| JP | 2008-283666 A | 11/2008 |
| JP | 2011-034551 A | 2/2011 |

OTHER PUBLICATIONS

Office Action issued in corresponding Japanese Application No. 2014-168763 dated Oct. 6, 2016, and English translation thereof (9 pages).

\* cited by examiner

*Primary Examiner* — Thomas D Lee
(74) *Attorney, Agent, or Firm* — Osha Liang LLP

(57) ABSTRACT

Disclosed is sprint apparatus, including: an information reporting unit that prepares a file indicating a predetermined situation to be reported, by using information having a predetermined format which can be displayed by a filer, and stores the file in a storing area which can be browsed by an external device via a network.

10 Claims, 13 Drawing Sheets

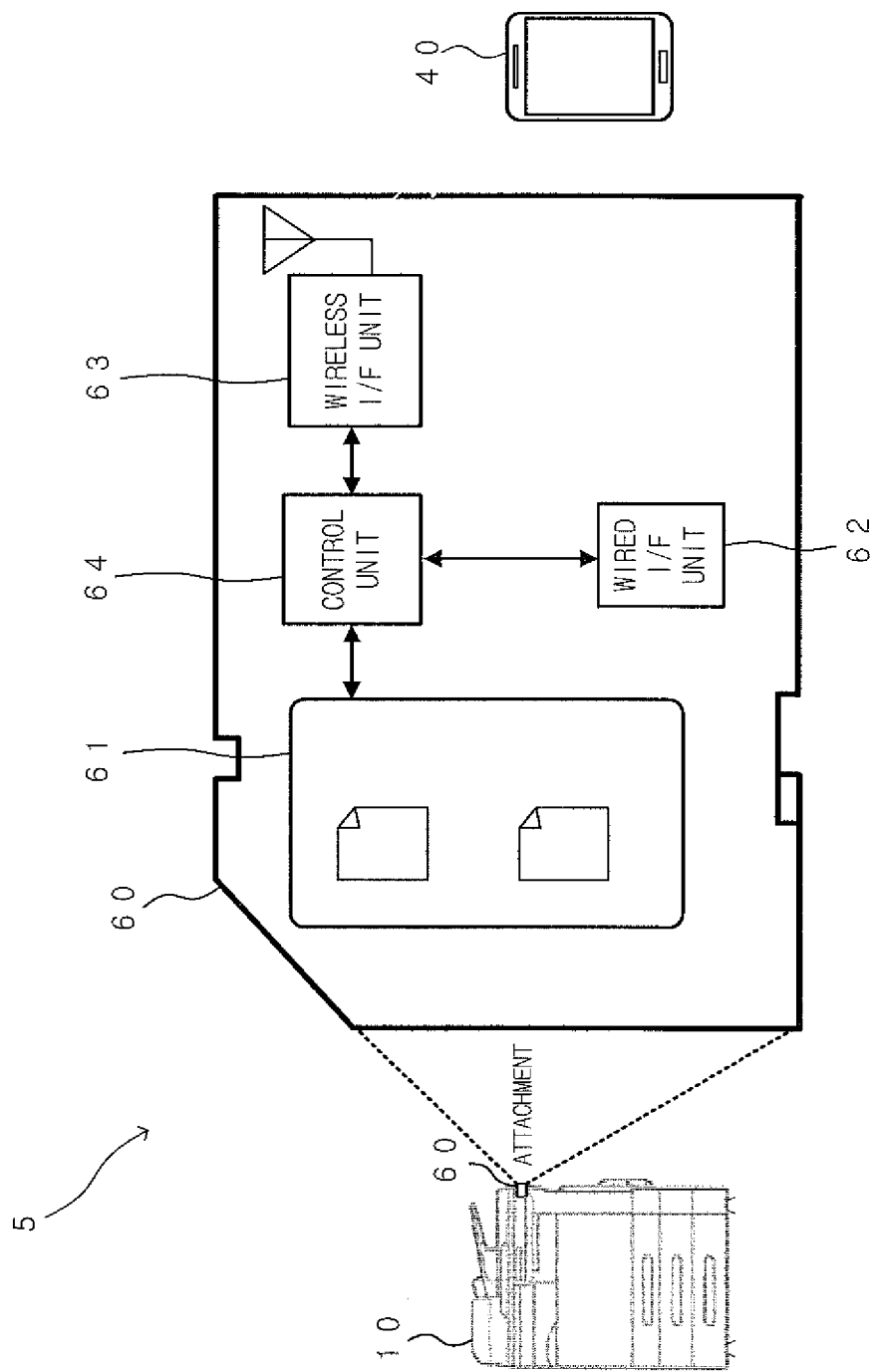

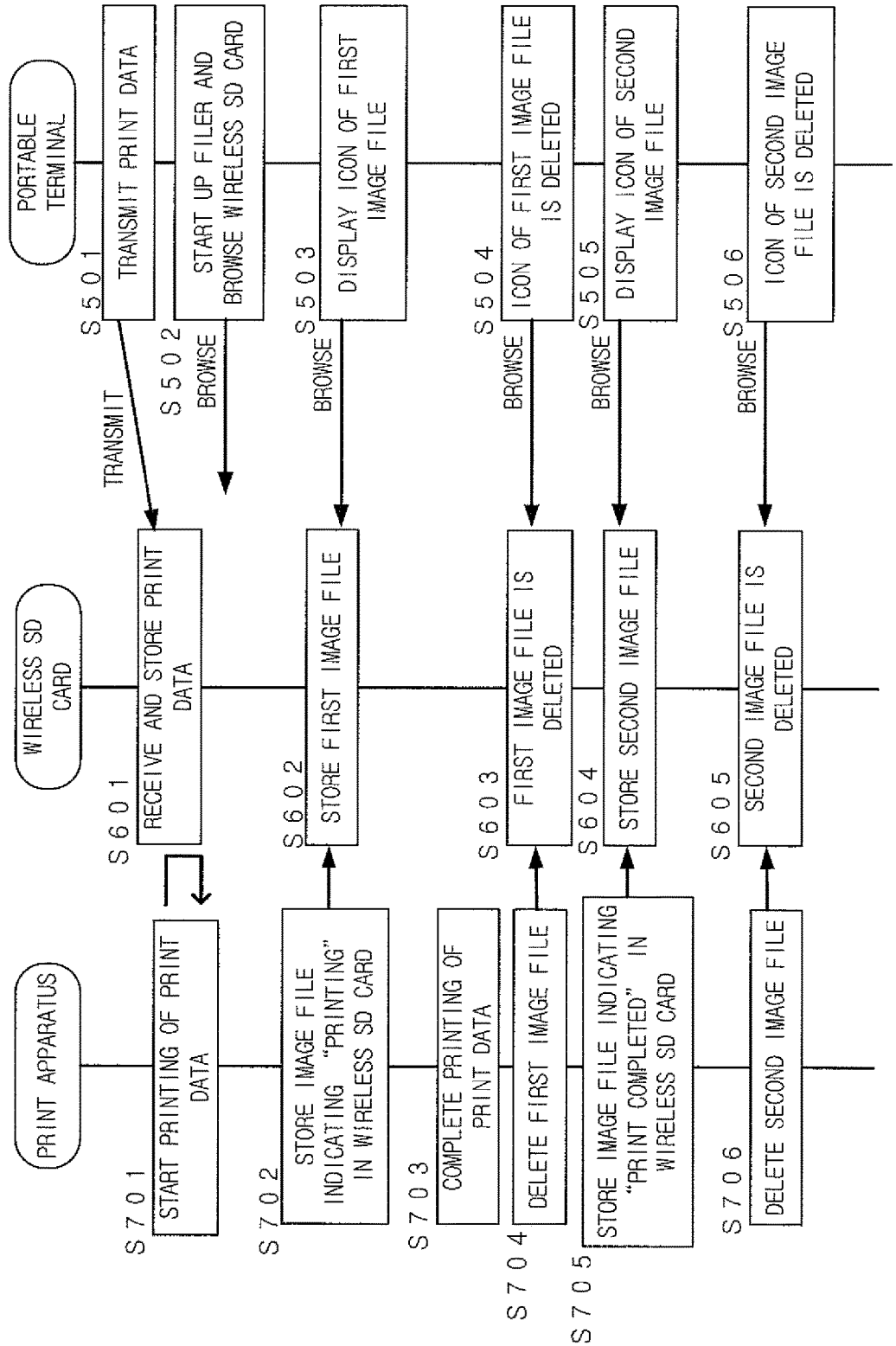

PRINT APPARATUS AND PRINT SYSTEM THAT REPORTS THE SITUATION OF THE PRINT APPARATUS

BACKGROUND OF THE INVENTION

Field of the Invention

The present invention relates to a print apparatus and a print system which reports the situation of the print apparatus and/or the status of the job to an external device.

Description of Related Art

As a method for reporting the situation of the print apparatus and/or the status of the job which is executed in the print apparatus, to a user, the following methods have been proposed.

(1) The information to be reported is displayed on the operation panel of the print apparatus.

(2) An exclusive application program is installed in a user's terminal, and the print apparatus transmits the information relating to the situation of the print apparatus or the like to the terminal in which the exclusive application program is installed, via a facsimile communication line or the like.

(3) The print apparatus has a Web server function, prepares a Web page indicating the situation of the print apparatus and/or the status of each job, and registers the Web page in a Web server. A user views the Web page by using a browser.

As the application of the above method (3), the following technology has been proposed. According to the progress of the printing, a thumbnail image of the page which has been printed is sequentially prepared and is registered in the Web page. Thereby, the progress status of the print job is reported to a user (See Japanese Patent Application Publication No. 2003-280867).

In the above method (1), the situation of the print apparatus or the status of the job cannot be confirmed from the terminal of each user. In the above method (2), the exclusive application program is required.

In the above method (3), the print apparatus or the situation of the print apparatus can be displayed on the user's terminal by using a general browser. However, the print apparatus is required to prepare the Web page indicating the situation of the print apparatus and/or the status of the job and register the Web page in a server and to update the Web page every when the situation of the print apparatus and/or the status of the job is changed. Further, every when the print apparatus receives the access from an external device, the print apparatus transmits the data in order to download the Web page. Therefore, the resource (a CPU or the like) of the print apparatus is consumed and the printing performance decreases. Further, because the Web page is decorated, the effort to prepare the Web page is required.

SUMMARY

A print apparatus reflecting one aspect of the present invention may comprise:

an information reporting unit configured to prepare a file indicating a predetermined situation to be reported, by using information having a predetermined format which can be displayed by a filer, and to store the file in a storing area which can be browsed by an external device via a network.

In one or more embodiments, the information having the predetermined format includes at least one of a file name of the file, an extension of the file and an image included in an image file.

In one or more embodiments, the situation to be reported includes at least one of a situation of the print apparatus, a situation of a reception of the print data and a status of a print job which is executed by the print apparatus.

In one or more embodiments, in case that after the information reporting unit prepares the file corresponding to one situation to be reported, the one situation to be reported is changed, the information reporting unit updates the information of the file, which has the predetermined format, so as to display the changed one situation to be reported.

In one or more embodiments, the information reporting unit sets an attribute of the file to a value for prohibiting the file from being deleted or a value for prohibiting the information from being changed by the external device.

In one or more embodiments, in case that the file stored in the storing area is deleted by the external device, the information reporting unit recovers the deleted file in the storing area.

In one or more embodiments, according to each type of the situation to be reported, a value of an extension of the file is previously related to the situation to be reported, and the information reporting unit sets the extension of the file indicating one situation to the value related to the one situation, and in case that the filer displays an icon related to the extension of the file stored in the storing area, the information reporting unit sets the icon to be displayed to the icon related to the situation to be reported by using the file.

In one or more embodiments, the print apparatus further comprises a storing medium connecting unit configured to detachably connect with a portable storing medium, wherein in case that the print apparatus executes a printing in accordance with a print data stored in the portable storing medium having a wireless communication function, which is connected with the storing medium connecting unit, the information reporting unit prepares the file indicating a situation of the printing which is executed in accordance with the print data, in the portable storing medium having the wireless communication function as the storing area.

BRIEF DESCRIPTION OF THE DRAWINGS

Embodiments of the present invention will become more fully understood from the detailed description given hereinafter and the accompanying drawings given by way of illustration only. These descriptions and illustrations are not intended to define the limits of the present invention.

FIG. 11 is a view showing an example of the configuration of the print system using a wireless SD card and the inner structure of the wireless SD card according to one or more embodiments;

FIG. 12 is a flowchart showing the process which is carried out in case that the print data is transmitted from the information processing terminal to the wireless SD card attached to the print apparatus in order to print an image according to one or more embodiments.

DETAILED DESCRIPTION OF EMBODIMENTS

Hereinafter, embodiments of the present invention will be explained with reference to the accompanying drawings.

First Embodiment

Figure 1:
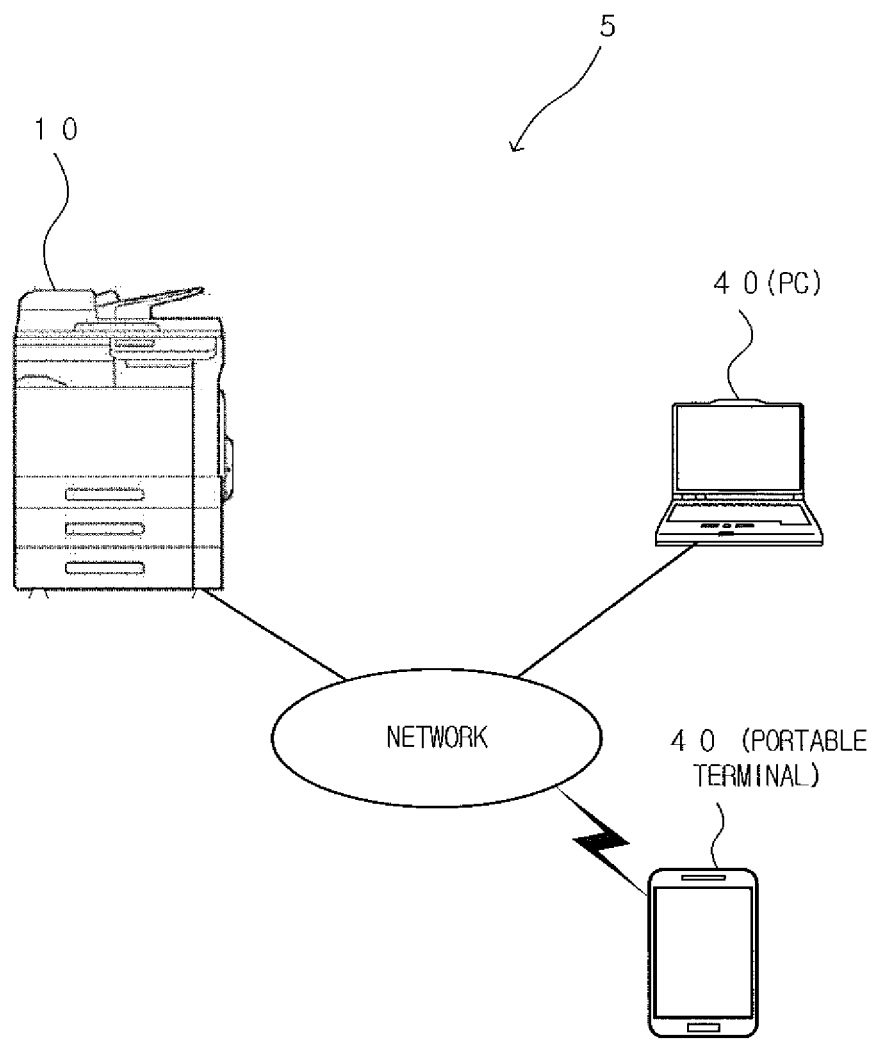
FIG. 1 is a view showing an example of the print system according to one or more embodiments.

FIG. 1 shows an example of the print system 5 according to the first embodiment. The print system 5 includes a print apparatus 10 and information processing terminals 40 connected with the print apparatus 10 via a network. In FIG. 1, a PC (Personal Computer) and a portable terminal are shown as the information processing terminal 40.

The print apparatus 10 carries out the printing in accordance with the print data received from the information processing terminal 40 or another external device via the network. The print apparatus 10 has the information reporting function for reporting the situation of the print apparatus 10 and/or the status of the job to an external device, such as the information processing terminal 40 or the like. The information processing terminal 40 transmits the print data to the print apparatus 10 and displays the situation of the print apparatus 10 and/or the status of the job via the network.

Figure 2:
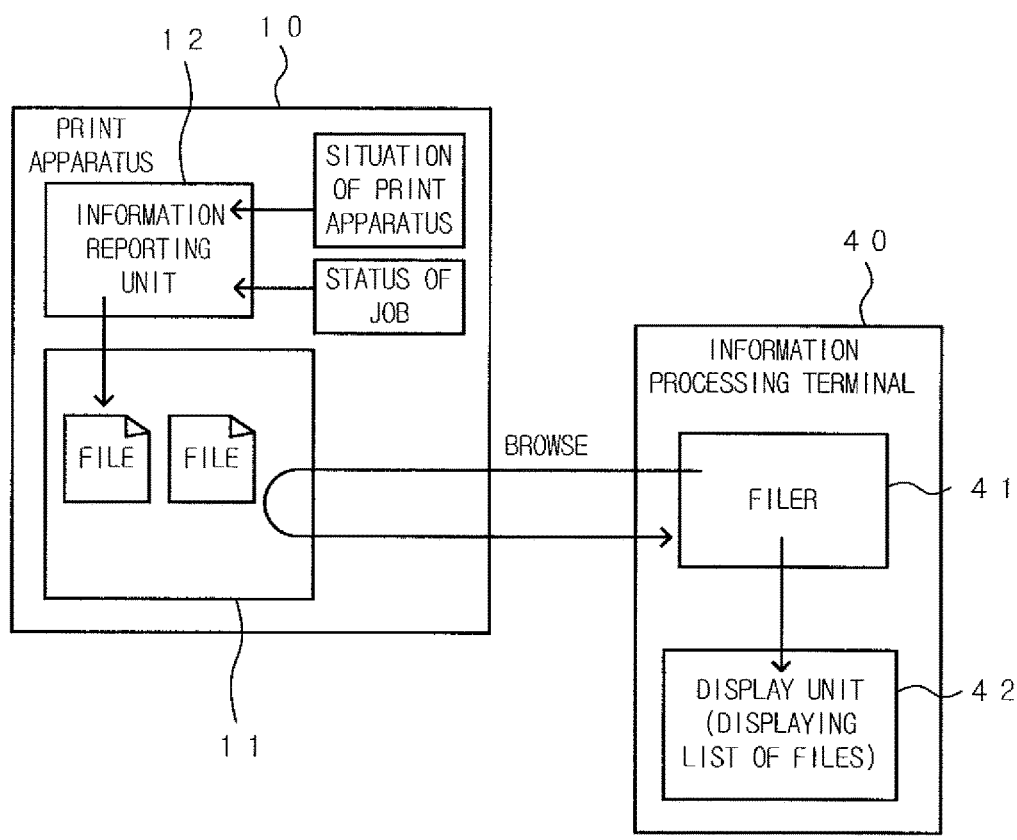
FIG. 2 is a view showing the schematic configuration relating to the information reporting function of the print system according to one or more embodiments.

FIG. 2 shows the schematic configuration relating to the information reporting function of the print system 5. The information processing terminal 40 is an information processing apparatus comprising a CPU (Central Processing Unit), a ROM (Read Only Memory), a RAM (Random Access Memory), a display unit, an operating unit, a communication unit and the like. In the information processing terminal 40, the filer 41 which is a program for managing the files is installed. The filer 41 is also referred to as the file manager. For example, as the filer 41, the Windows® Explorer which is made by Microsoft Corporation is exemplified. In general, the filer 41 has the function for displaying the file name, the extension (type), the update time, the size and the like of each file stored in the folder managed by the file system, as a list. Further, the filer 41 has the function for displaying an icon of each file, which is previously related to the extension of the file. In case that the file is an image file, the filer 41 has the function for displaying the thumbnail image of the image thereof as the icon.

The print apparatus 10 has the report shared folder 11 which is a storing area which can be browsed by using the filer 41 of the information processing terminal 40 via the network. The report shared folder 11 is a part of the storing area which is managed by the file system of the print apparatus 10. The attribute of the report shared folder 11 is set to "shared" so as to browse the report shared folder 11 from an external device.

The print apparatus 10 comprises the information reporting unit 12 having the function for reporting the situation to be reported, such as the situation of the print apparatus 10, the status of each job received by the print apparatus 10 or the like, to the image processing terminal 40. The information reporting unit 12 reports the situation of the print apparatus 10, the situation relating to the receipt of the print data, the status of the job to be processed by the print apparatus 10 or the like, to an external device. The situation of the print apparatus 10 includes, for example, the remaining amount of the toner, the existence of the paper jamming, and the like. The status of the job includes the waiting state, the running state, the completed state, the occurrence of the error, and the like.

The information reporting unit 12 prepares the file indicating the situation to be reported by using the information having the predetermined format which can be displayed by the filer 41, and stores the file in the report shared folder 11 which can be browsed from an external device via the network.

The information having the predetermined format which can be displayed by the filer 41 includes at least one of the file name, the extension of the file and the image included in the image file.

The user of the information processing terminal 40 starts up the filer 41, and browses the report shared folder 11 of the print apparatus 10 by using the filer 41. The filer 41 displays the display window (file list window) in which the file name and the like of each file stored in the report shared folder 11 are listed, on the display unit 42 of the information processing terminal 40.

Figure 3:
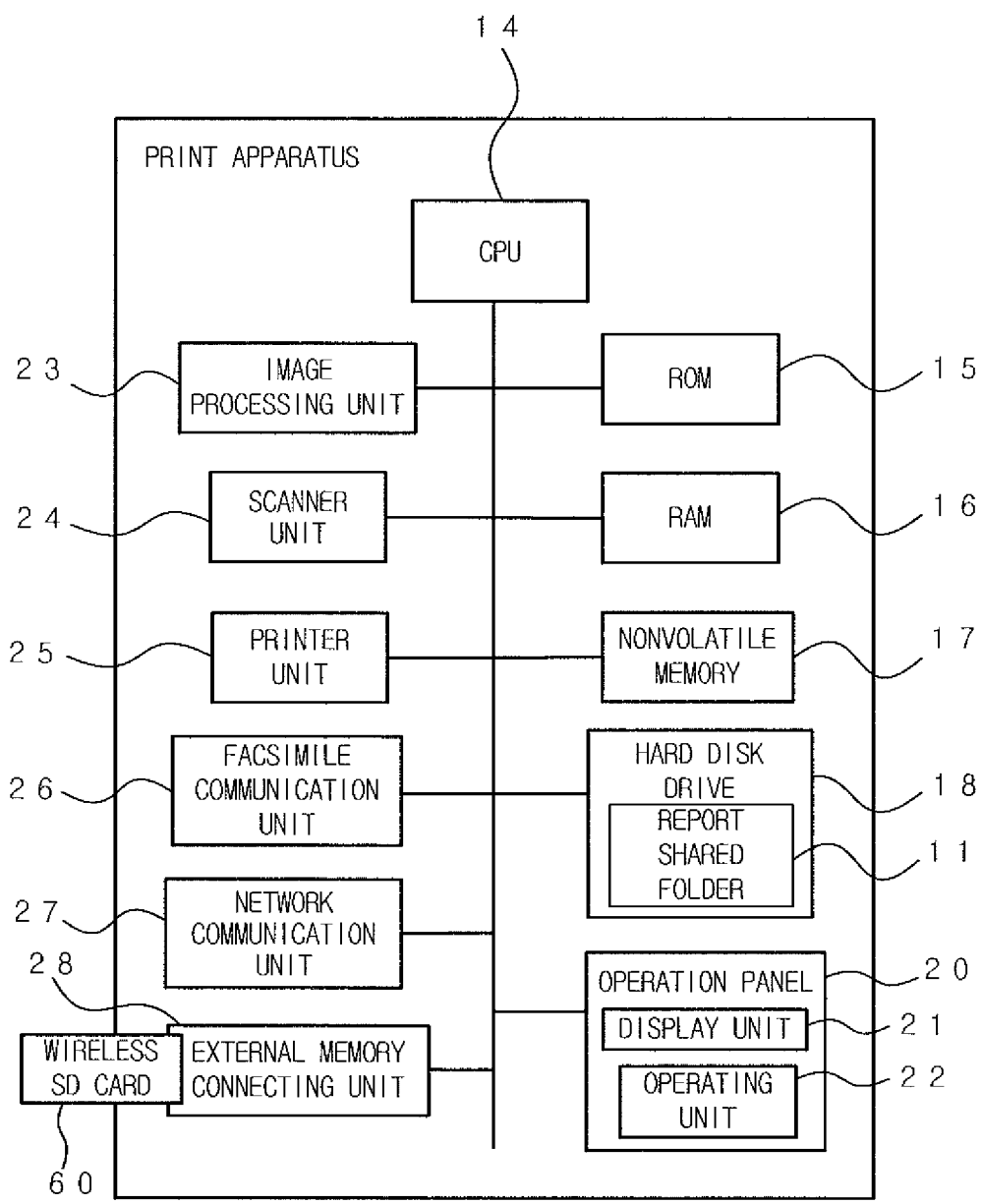
FIG. 3 is a block diagram showing the electric schematic configuration of the print apparatus according to one or more embodiments.

FIG. 3 is a block diagram showing the electric schematic configuration of the print apparatus 10. The print apparatus 10 comprises a CPU (Central Processing Unit) 14 for wholly controlling the operation of the print apparatus 10 as the control unit. The CPU 14 is connected with a ROM (Read Only Memory) 15, a RAM (Random Access Memory) 16, a nonvolatile memory 17, a hard disk drive 18, an operation panel 20, an image processing unit 23, a scanner unit 24, a printer unit 25, a facsimile communication unit 26, a network communication unit 27, an external memory connecting unit 28 and the like, via a bus.

By the CPU 14, a middleware, application programs and the like are executed on an OS (Operating System) program as a base. The CPU 14 has the function as the above information reporting unit 12.

In the ROM 15, various types of programs are stored. By executing the processes by the CPU 14 in accordance with these programs, the functions of the print apparatus 10 are realized. The RAM 16 is used as a work memory for temporarily storing various data when the CPU 14 executes the process in accordance with the programs and as an image memory for storing image data.

The nonvolatile memory 17 is a memory (flash memory) in which the stored contents are not damaged even if the print apparatus 10 is turned off, and is used for storing various setting information and the like.

The hard disk drive 18 is a large-capacity nonvolatile memory device. In the hard disk drive 18, an OS program, various types of application programs, user information, print data, image data, a job history and the like, are stored. Further, the above-described report shared folder 11 is also provided in the storing area of the hard disk drive 18.

The operation panel 20 comprises the display unit 21 and the operating unit 22. The display unit 21 comprises a liquid crystal display (LCD) and the like, and has the function for displaying various types of operation windows, setting windows and the like. The operating unit 22 comprises hardware switches, such as a start button, a cancel button and the like, and a touch panel which is provided on the screen of the display unit 21, and the like, and receives various types of operations from a user.

The image processing unit 23 carries out the rasterizing process for converting print data into image data, the compression/decompression process for the image data, and the like in addition to the processings, such as the enlargement/reduction or the rotation of image data.

The scanner unit 24 has the function for obtaining image data by optically reading an image of an original. The scanner unit 24 comprises, for example, a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The printer unit 25 has the function for forming an image on the recording paper in accordance with the image data. In this embodiment, the printer unit 25 is configured as a so-called laser printer which comprises a conveying device for the recording paper, a photoconductive drum, a charging device, a laser unit, a developing device, a transfer and separation device, a cleaning device and a fixing device, and which forms an image by the electrophotographic process. Alternatively, an image may be formed by another type of printer.

The facsimile communication unit 26 has the function for transmitting and receiving the image data to/from an external device having the facsimile function via a public line.

The network communication unit 27 has the function for communicating data with an external device, such as the information processing terminal 40, via a network, such as LAN or the like.

The external memory connecting unit 28 is a connecting unit to which a portable storing medium, such as a wireless SD card 60 or the like, is detachably attached. That is, the external memory connecting unit 28 has the function as the storing medium connecting unit for detachably connecting with the portable storing medium. The external memory connecting unit 28 has a connector for detachably connecting with the portable storing medium and an I/F (Interface) circuit.

Figure 4:
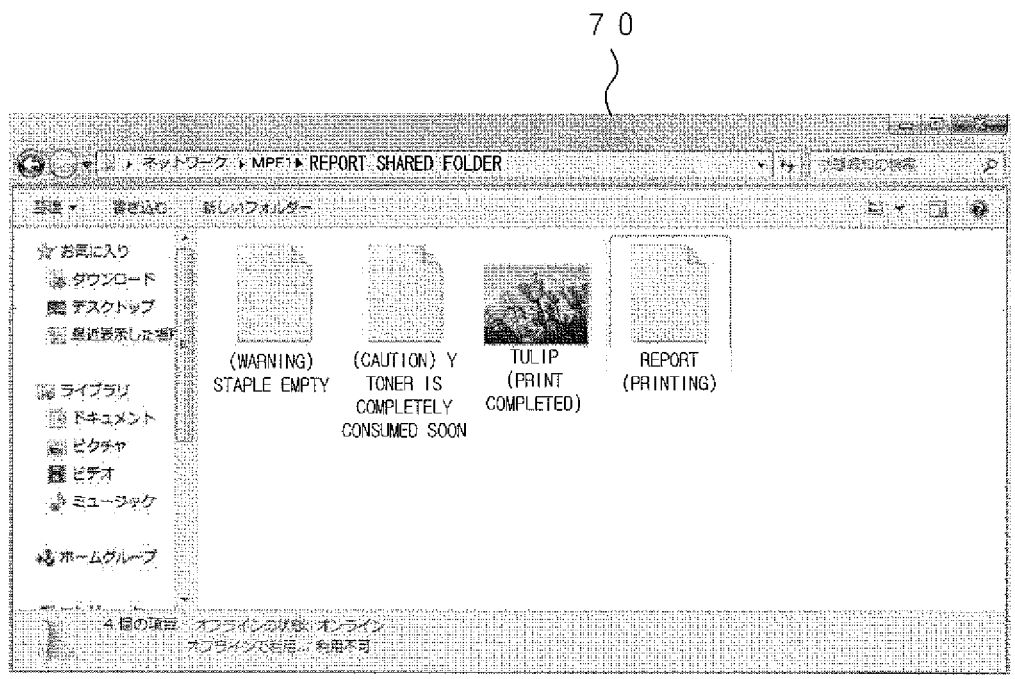
FIG. 4 is a view showing an example of the file list window which is displayed by the filer of the information processing terminal.

FIG. 4 shows an example of the file list window 70 which is displayed by the filer 41 of the information processing terminal 40 which browses the report shared folder 11 of the print apparatus 10. In this example, the file having the file name "(Warning) Staple empty", the file having the file name "(Caution) Y toner is completely consumed soon", the file having the file name "tulip (print completed)", and the file having the file name "report (printing)" are stored in the report shared folder 11. The icons corresponding to these files and the file names are displayed in the file list window 70. The file list window 70 shown in FIG. 4 is one displayed in case that the display setting of the filer 41 is set to "large icon".

Figure 5:
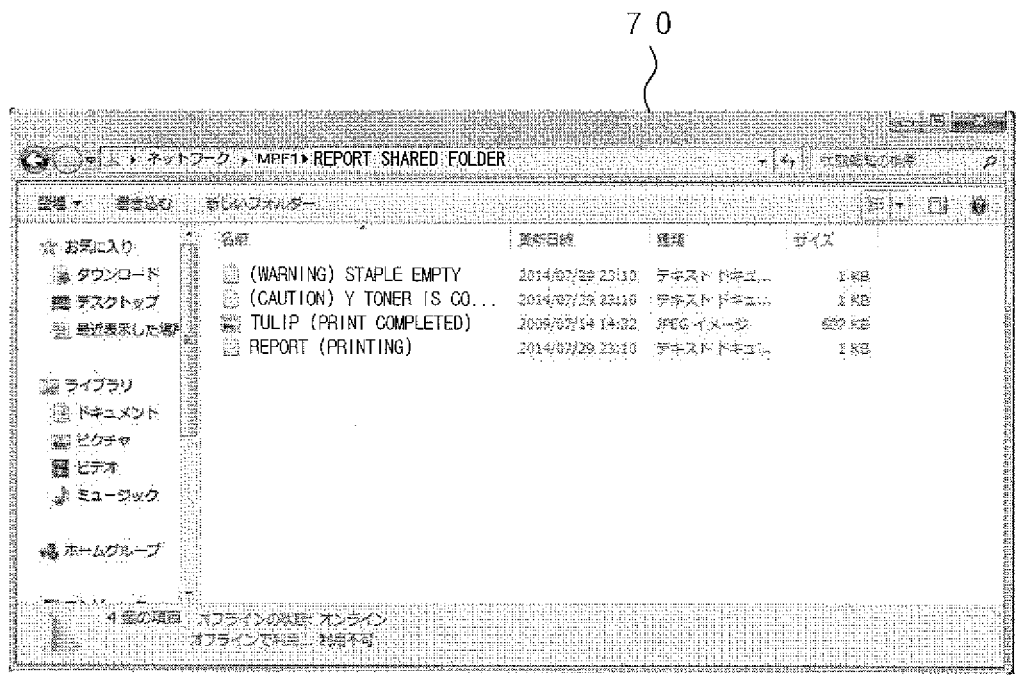
FIG. 5 is a view showing an example of the file list window in case that the display setting of the filer is set to "detail"

FIG. 5 shows the file list window 70 in case that the display setting of the filer 41 is set to "detail". The situation of the browsed report shared folder 11 is the same as the situation shown in FIG. 4. As described above, even though the situation of the files stored in the report shared folder 11 is the same, it is possible to change the display format variously by setting the display setting of the filer 41.

Figure 6:
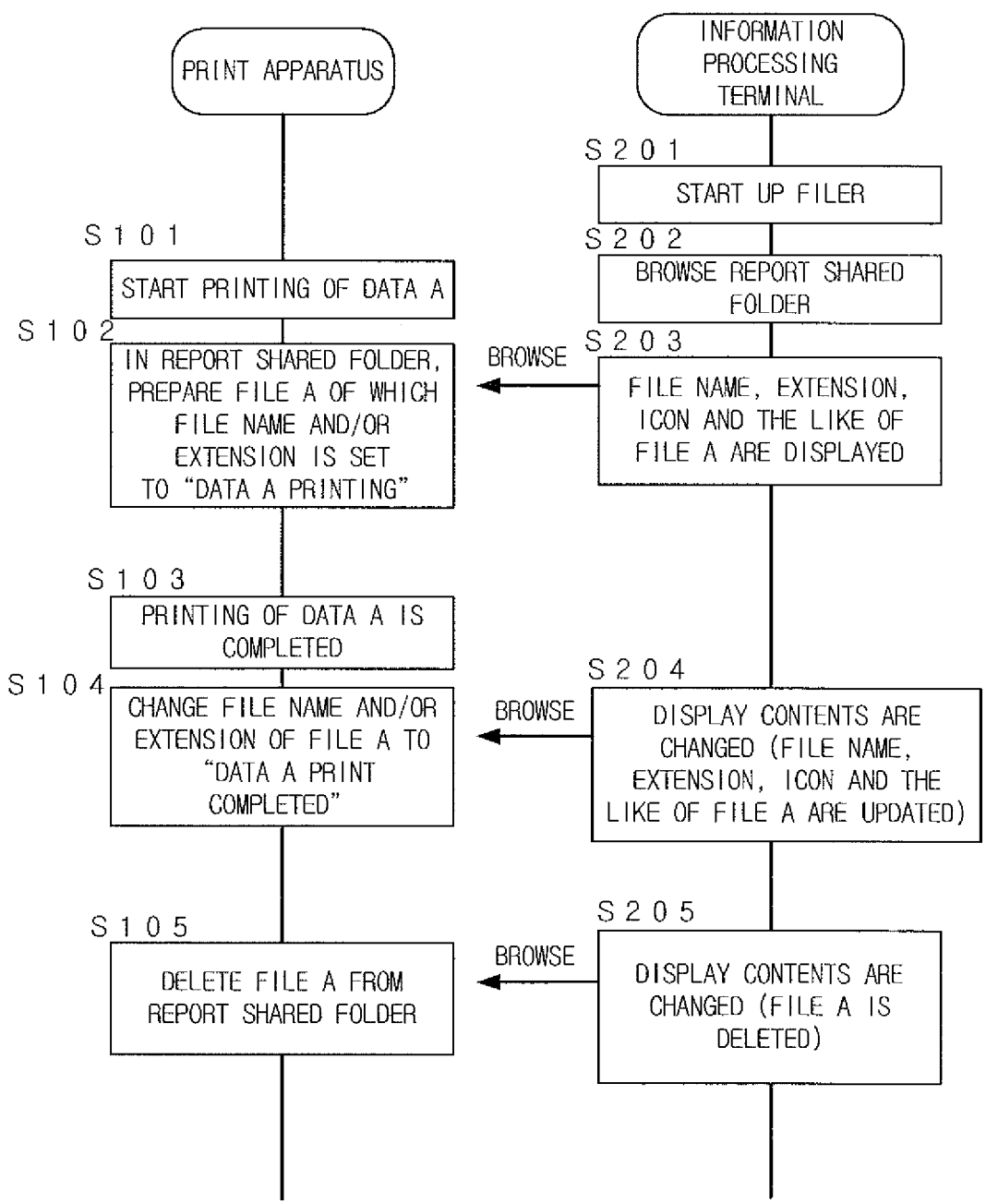
FIG. 6 is a flowchart showing the process relating to the information reporting function which is carried out by the print system when the print job is executed according to one or more embodiments.

FIG. 6 shows the flowchart the process relating to the information reporting function which is carried out by the print system 5 when the print job is executed. When the print apparatus 10 starts the printing of the data A (Step S101), the information reporting unit 12 of the print apparatus 10 prepares the file A indicating that the data A is currently printed by using the file name and/or the extension, and stores the file A in the report shared folder 11 (Step S102).

In the information processing terminal 40, the filer 41 is started up by the user (Step S201). The folder to be browsed by the filer 41 is set to the report shared folder 11 (Step S202). The filer 41 browses the report shared folder 11, and displays the file list window 70 in which the file name and the like of each file stored in the report shared folder 11 are listed (Step S203).

When the printing of the data A is completed by the print apparatus 10 (Step S103), the information reporting unit 12 of the print apparatus 10 changes the file name and/or the extension of the file A to ones indicating that the printing of the data A is completed (Step S104).

The filer 41 of the information processing terminal 40 monitors the situation of the files stored in the report shared folder 11. When the change in one file stored in the report shared folder 11 is caused, the filer 41 updates the contents displayed in the file list window 70 so as to correspond to the changed contents of the report shared folder 11 (Step S204). In this example, the file name of the file A is changed.

When the predetermined time elapses since the printing of the data A is completed, the print apparatus 10 deletes the file A (Step S105). Accordingly, the filer 41 deletes the indication relating to the file A from the file list window 70 (Step S205).

In FIG. 6, the case in which the status of the job is reported is shown. Also, in case that the situation of the print apparatus 10 is reported, the print system 5 carries out the same operation. For example, when the remaining amount of the yellow (Y) toner is not more than the predetermined amount, the information reporting unit 12 prepares the file for reporting the situation relating to the toner and indicating that the remaining amount of the yellow (Y) toner becomes small by using the filename and/or the extension, in the report shared folder 11. When the yellow (Y) toner is supplied, the information reporting unit 12 deletes the above file from the report shared folder 11.

The information reporting unit 12 sets the attribute of each file prepared in the report shared folder 11 so as to not change the file name and the like of the file stored in the report shared folder 11 or so as to not delete the file stored in the report shared folder 11 by an external device. For example, the files are set to "read only", the security setting of each file is set to "prohibition of changes", or the file is set to the situation in which another program opens the file.

Figure 7:
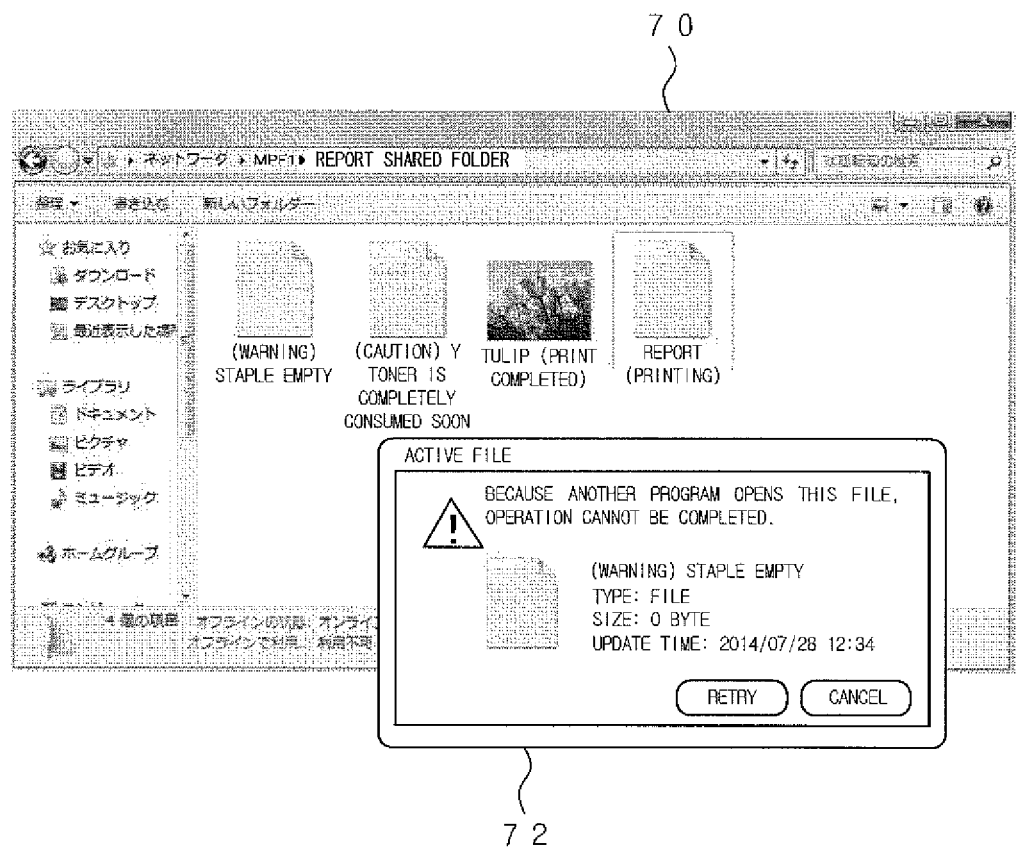
FIG. 7 is a view showing an example of the window which is displayed in case that the deletion operation is carried out for the file stored in the report shared folder.

FIG. 7 shows the example of the window which is displayed in case that the deletion operation is carried out for the file stored in the report shared folder 11 by using the information processing terminal 40. Because the deletion operation is prohibited from being carried out for the file stored in the report shared folder 11, when the user carries out the deletion operation for the file from the information processing terminal 40, as shown in FIG. 7, the warning window 72 is displayed as a pop-up display on the information processing terminal 40. In the example of FIG. 7, the case in which the user carries out the deletion operation for the file indicating the situation of the print apparatus 10 by using the file name, specifically, the file having the file name "(Warning) stable empty", is shown.

The information reporting unit 12 of the print apparatus 10 has the function for recovering the deleted file so as to avoid issues even though the file stored in the report shared folder 11 is deleted by an external device.

Figure 8:
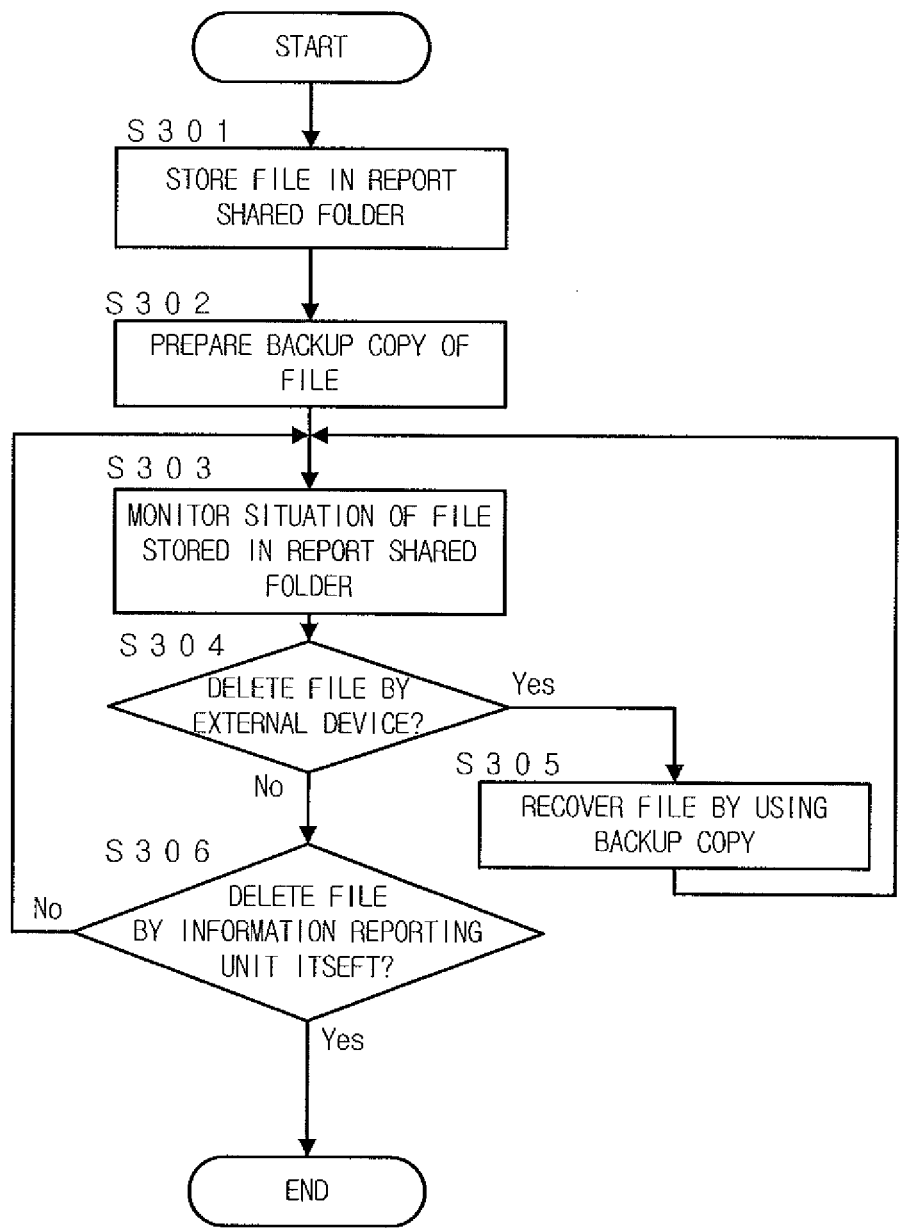
FIG. 8 is a flowchart showing the process relating to the recovery of the deleted file, which is carried out by the information reporting unit according to one or more embodiments.

FIG. 8 shows the process relating to the recovery of the deleted file, which is carried out by the information reporting unit 12. When the situation to be reported is caused, the information reporting unit 12 prepares the file (referred to as the file B) indicating the contents to be reported by using the file name and/or the extension, and stores the file B in the report shared folder 11 (Step S301). The process shown in FIG. 8 is shown as the process relating to one file B.

The information reporting unit 12 prepares the backup copy of the file B at the same time when the file B is stored (Step S302). Specifically, the copy of the file B stored in the report shared folder 11 is stored in another storing area, e.g., in the area to which an external device cannot access.

The information reporting unit 12 monitors the situation of the file B stored in the report shared folder 11 (Step S303). When the file B is deleted by an external device (Step S304; Yes), the file B is recovered (restored) in the report shared folder 11 by using the backup copy of the file B (Step S305). Then, the information reporting unit 12 continues to monitor the situation by returning to Step S303.

In case that the information reporting unit 12 itself deletes the file B (Step S304; No and Step S306; Yes), the process is ended. In case that the file B is not deleted (Step S306; No), the information reporting unit 12 continues to monitor the situation by returning to Step S303.

As described above, the filer 41 has the function for displaying the icon of each file, which is previously related to the extension of the file.

In the print system 5, the relation among the contents to be reported, the extension of the file and the type of icon is previously determined. The icon corresponding to the contents to be reported is displayed in the file list window 70 of the filer 41. The extension used in the print system 5 is the exclusive extension for the print system 5, which cannot be used in the other application programs. Further, the image used for the icon (referred to as the icon image) is also exclusive for the print system 5.

In case that the file is prepared in the report shared folder 11, the print apparatus 10 prepares the file having the extension corresponding to the contents to be reported and stores the file in the report shared folder 11.

In the information processing terminal 40, the exclusive icon image is previously registered so as to relate to the above exclusive extension. In case that there are a plurality of exclusive extensions, the icon images which are different according to the extensions are used. The exclusive icons are provided by the print apparatus 10. For example, the print apparatus 10 stores the icon images classified by the extensions in the shared folder of the print apparatus 10, and the icon images can be used by a user. In case that the file name of the icon image is the same as the extension corresponding to this icon image, a user can easily recognize how each icon image is related to the extension.

In the image processing terminal 40, the above relation is carried out. When the display setting of the filer 41 is set to "icon display" and the report shared folder 11 of the print apparatus 10 is browsed by the filer 41, the exclusive icon corresponding to the contents to be reported by using the file is displayed for each file stored in the report shared folder 11. The user can recognize the reported contents according to the type of icon without reading the file name.

In case that the contents relating to one situation to be reported are changed, the print apparatus 10 changes the extension of the file corresponding to the situation to be reported to the value corresponding to the changed contents. The filer 41 of the information processing terminal 40 changes the icon of the file having the changed extension to the icon which is related to the changed extension.

Figure 9:
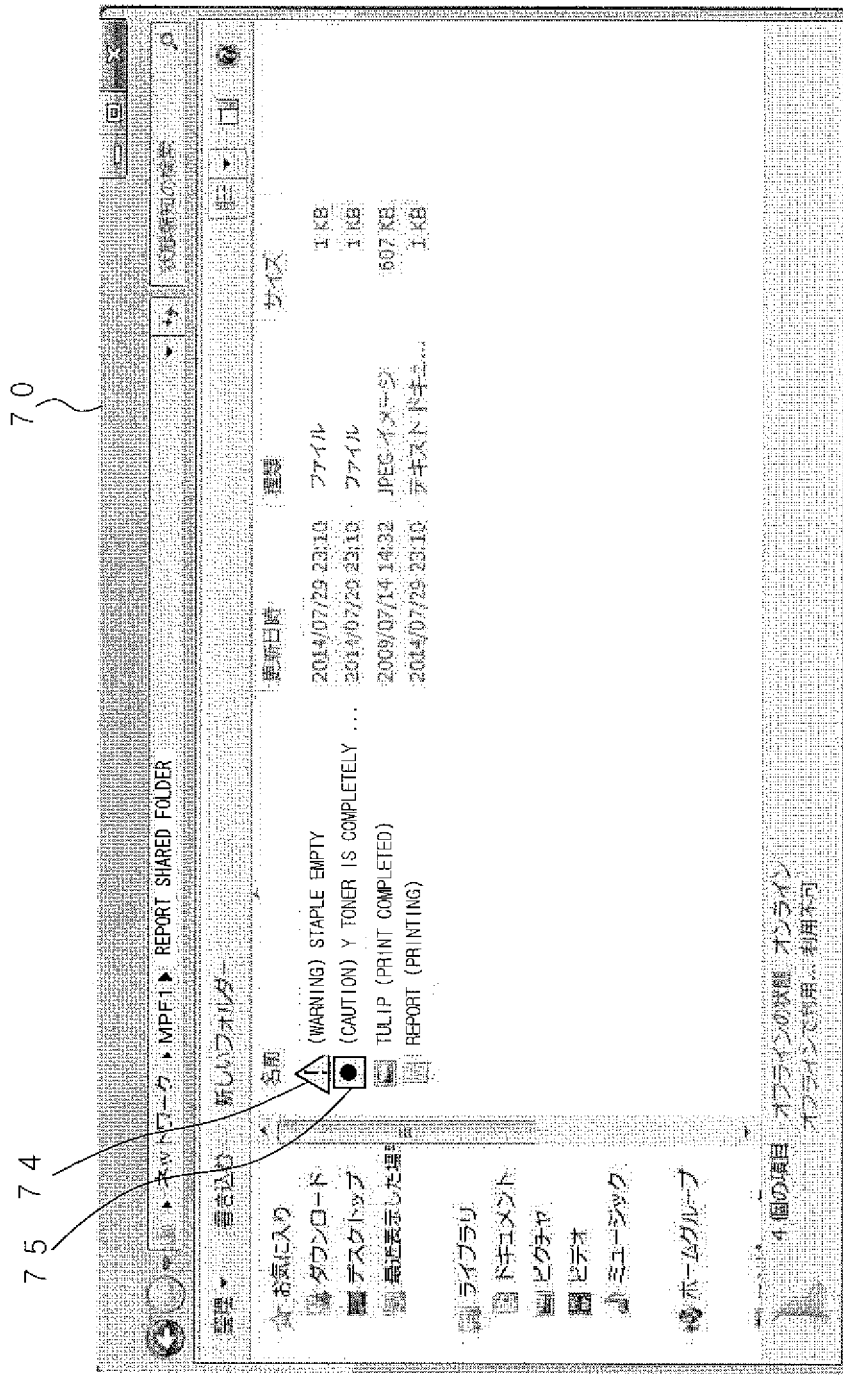
FIG. 9 is a view showing an example of the file list window in which the exclusive icons are displayed.

FIG. 9 shows an example of the file list window 70 in which the exclusive icons are displayed. In this example, in case that the reported contents indicate the "warning", the first extension is used. In case that the reported contents indicate the "caution", the second extension is used. The filer 41 displays the warning icon 74 for the file having the first extension, and displays the caution icon 75 for the file having the second extension.

Figure 10:
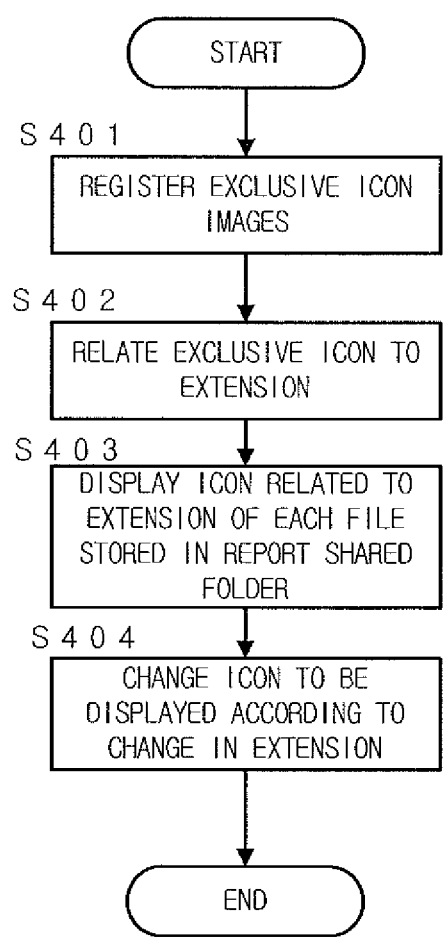
FIG. 10 is a flowchart showing the process which is carried out by the information processing terminal in case that the exclusive icons are displayed according to one or more embodiments.

FIG. 10 shows the process which is carried out by the information processing terminal 40 in case that the exclusive icons are displayed. In the information processing terminal 40, firstly, the exclusive icon images are downloaded from the print apparatus 10 or the like in order to register them (Step S401). Next, the user sets the information processing terminal 40 so as to relate the exclusive icon images to the extensions (Step S402). Thereby, the preparation work for the information processing terminal 40 is finished.

The user browses the report shared folder 11 of the print apparatus 10 by using the filer 41 at the display setting for displaying the icons. The filer 41 displays the icon for each file stored in the report shared folder 11, by using the exclusive icon image which is related to the extension of the file (Step S403). Further, when the extension of the file stored in the report shared folder 11 is changed, the filer 41 rewrites the icon for the file having the changed extension by using the icon image corresponding to the changed extension (Step S404).

Alternatively, for example, the work for registering the exclusive icon images and the extensions in the information processing terminal 40 so as to relate them to each other may be automatically carried out by the printer driver installed in the information processing terminal 40 in order to use the print apparatus 10. When the printer driver is installed in the information processing terminal 40, the printer driver automatically fetches the exclusive icon images and the information indicating the extensions related to the exclusive icon images from the print apparatus 10. Then, the exclusive icon images and the extensions are registered in the information processing terminal 40 so as to relate them to each other.

Second Embodiment

Next, the second embodiment will be explained.

In the second embodiment, the print apparatus 10 is instructed to print an image by transmitting the image data from the information processing terminal 40 to the wireless SD card 60 attached to the print apparatus 10. Each configuration of the print apparatus 10 and the information processing terminal 40 is the same as that of the first embodiment.

FIG. 11 shows an example of the configuration of the print system 5 using the wireless SD card 60 and the inner structure of the wireless SD card 60. The wireless SD card 60 comprises a memory unit 61, a wired I/F unit 62 for accessing to the memory unit 61 via the wired communication, a wireless I/F unit 63 for accessing to the memory unit 61 via the wireless communication, and a control unit 64 for controlling the reading and the writing of the data for the memory unit 61 and the whole operation of the wireless SD card 60. The wireless SD card 60 is detachably connected mechanically and electrically with the external memory connecting unit 28 of the print apparatus 10 by a connector of the wired I/F unit 62.

The wireless SD card 60 can be wirelessly connected with the information processing terminal 40 by the wireless communication using the wireless I/F unit 63, such as a wireless LAN or the like. The information processing terminal 40 can write the print data in the memory unit 61 of the wireless SD card 60 via the wireless communication. Further, the information processing terminal 40 can browse and read the files stored in the memory unit 61 of the wireless SD card 60.

The information processing terminal 40 has the filer 41 like the first embodiment.

FIG. 12 shows the flowchart of the process which is carried out in case that the print data is transmitted from the information processing terminal 40 to the wireless SD card 60 attached to the print apparatus 10 in order to print an image.

The information processing terminal 40 transmits the print data to the wireless SD card 60 attached to the external memory connecting unit 28 of the print apparatus 10 (Step S501). The wireless SD card 60 stores the received print data in the memory unit 61 (Step S601). The wireless SD card 60 may be attached to the external memory connecting unit 28 of the print apparatus 10 after the print data is transmitted.

In the information processing terminal 40, the filer 41 is started up by the user and the browsing destination of the filer 41 is set to the predetermined shared folder in the memory unit 61 of the wireless SD card 60 (Step S502). The filer 41 of the information processing terminal 40 monitors the predetermined shared folder in the memory unit 61 of the wireless SD card 60 and displays the list of the files stored in the shared folder. When the situation in the shared folder is changed, the display contents of the list are updated.

When the print apparatus 10 detects the print data stored in the memory unit 61 of the wireless SD card 60 attached to the external memory connecting unit 28, or when the print apparatus 10 receives a print instruction, the print apparatus 10 starts the printing in accordance with the print data (Step S701). At this time, the information reporting unit 12 of the print apparatus 10 prepares the file for reporting the status of the job for printing the image in accordance with the print data, and stores the prepared file in the predetermined shared folder in the memory unit 61 of the wireless SD card 60 (Step S702).

In this case, the information reporting unit 12 prepares the image file in which the image obtained by overlaying the text indicating the status of the job on the image obtained by rasterizing the print data is included. Further, the file name of the above image file is set to the name obtained by adding the text indicating the status of the job to the file name of the original print data.

In detail, when the printing is started in accordance with the print data, the information reporting unit 12 prepares the image obtained by overlaying the text "printing" on the image (or the reduced image) corresponding to the print data, and stores the first image file including the prepared image in the predetermined shared folder of the memory unit 61 of the wireless SD card 60.

Figure 13C:
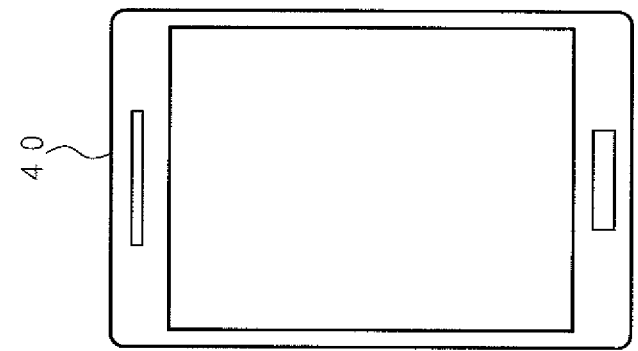
FIGS. 13A to 13C are views showing the change in the window which is displayed by the filer of the information processing terminal in the process shown in FIG. 12 according to one or more embodiments.
Figure 13B:
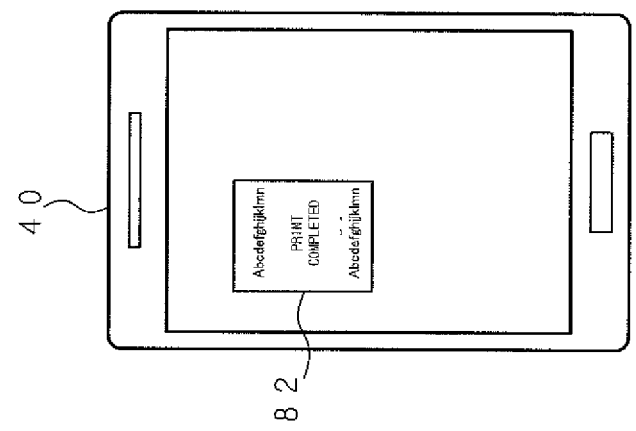
Figure 13A:
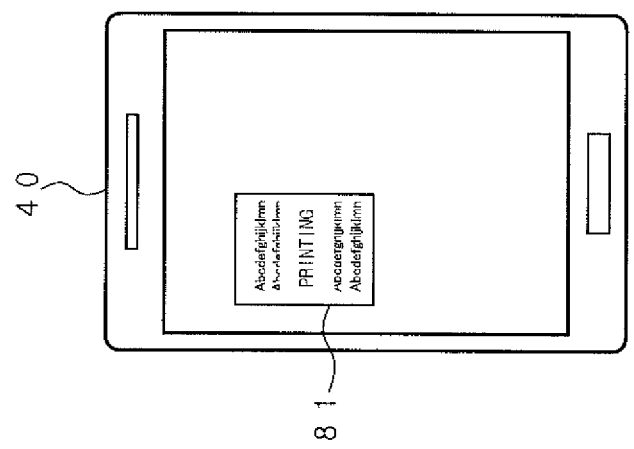

When the first image file is stored in the wireless SD card 60 (Step S602), the filer 41 of the information processing terminal 40 displays the icon 81 corresponding to the first image file (See FIG. 13A). In this case, the filer 41 displays the icon for the image file by using the image included in the image file as the icon image.

When the printing in accordance with the above print data is completed (Step S703), the information reporting unit 12 deletes the first image file (Step S704). Further, the information reporting unit 12 prepares the image obtained by overlaying the text "print completed" on the image (or the reduced image) corresponding to the print data, and stores the second image file including the prepared image in the predetermined shared folder of the memory unit 61 of the wireless SD card 60 (Step S705).

When the first image file is deleted from the memory unit 61 of the wireless SD card 60 (Step S603), the filer 41 of the information processing terminal 40 deletes the icon 81 corresponding to the first image file from the display window. Further, when the second image file is stored in the predetermined shared folder of the memory unit 61 of the wireless SD card 60 (Step S604), the filer 41 of the information processing terminal 40 displays the icon 82 corresponding to the second image file (See FIG. 13B).

When the predetermined time elapses since the information reporting unit 12 stores the second image file in the memory unit 61 of the wireless SD card 60, the information reporting unit 12 deletes the second image file from the memory unit 61 of the wireless SD card 60 (Step S706).

When the second image file is deleted from the wireless SD card 60 (Step S605), the filer 41 of the information processing terminal 40 deletes the icon 82 corresponding to the second image file from the display window (See FIG. 13C).

In the above example, in case that the status of the job is changed, the first image file is deleted and the second image file is prepared. However, the contents of the first image file may be rewritten. In this case, because the update time is changed, the filer 41 updates the display contents. Further, the filer 41 displays the icon by using the image included in the image file as the icon image. However, the file name of the image file may be displayed. The display format of the filer 41 depends on the display setting of the filer 41.

As described above, in the print system 5 according to the first and the second embodiments, when the situation of the print apparatus 10 and/or the status of the job is reported, the print apparatus 10 prepares the file indicating the situation to be reported by using the information having the format which can be displayed by the filer 41. Then, the print apparatus 10 stores the prepared file in the storing area (the report shared folder 11) which can be browsed from an external device via the network. Therefore, the processing task and the resource to be consumed are reduced as compared with the case in which the exclusive Web page is prepared and updated. Therefore, one or more embodiments can avoid performance degradation relating to the printing by the print apparatus reporting the situation of the apparatus and/or the status of the job.

Further, in the information processing terminal 40, a general-purpose filer 41 can be sufficiently used. Therefore, as compared with a system in which an exclusive application program is required, the burden on a user is reduced.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In these embodiments, as the information having the predetermined format which can be displayed by the filer, the file name, the extension and the image included in the image file are exemplified. However, the above information is not limited to these. The contents to be reported can be shown by using optional information which can be displayed by the filer.

The area in which the file for reporting the situation is stored is not limited to the inner memory of the print apparatus 10 or the wireless SD card 60. For example, the shared storing area provided in the server on the network may be used.

In these embodiments, as an example of the situation to be reported, the situation of the print apparatus and the state of the job are exemplified. However, the situation to be reported is not limited to these, and may be optional information. For example, the situation relating to the reception of the print data (receiving, reception completed, percentage of the received data, and the like) may be displayed.

One or more embodiments provide a print apparatus and a print system which can report the situation of the print apparatus, the status of the job or the like, to an external device without using an exclusive application program so as to suppress the required amount of the resource of the print apparatus.

In one or more embodiments, the file indicating the situation to be reported by using the information having the predetermined format which can be displayed by the filer, such as the file indicating the situation by using the file name, is stored in the storing area which can be browsed by an external terminal device via the network. In case that the external terminal device browses the above storing area by using the filer, the situation to be reported is displayed as a list of the files by the filer.

In one or more embodiments, the file name is displayed as the text in the window of the filer. The extension is displayed as the type of the file or the corresponding icon in the window of the filer. For example, the image included in the image file is reduced and displayed or is displayed as a preview display in the display window of the filer according to the setting of the filer.

In one or more embodiments, the file itself is continuously stored and the file name or the extension thereof is changed according to the change in the contents to be reported.

In one or more embodiments, the information reporting unit sets the attribute of the file so as to not delete the file or so as to not change the information of the file from an external device.

In one or more embodiments, the contents to be reported, the extension of the file for reporting the situation and the type of the icon which is displayed by the filer so as to correspond to the file, are related to each other.

In one or more embodiments, in case that the printing is executed in accordance with the print data stored in the portable storing medium having the wireless communication function, which is connected with the storing medium connecting unit of the print apparatus, the file indicating the situation of the printing which is executed in accordance with the print data, by using the information having the predetermined format which can be displayed by the filer, is prepared in the storing area of the portable storing medium having the wireless communication function. By browsing the storing area of the portable storing medium via the wireless communication by the filer of the external device, the status of the print job is displayed by the filer.

According to the print apparatus and the print system, it is possible to report the situation of the print apparatus, the status of the job or the like, to an external device without using an exclusive application program so as to suppress the required amount of the resource of the print apparatus.

The present U.S. patent application claims the priority of Japanese Patent Application No. 2014-168763, filed on Aug. 21, 2014, according to the Paris Convention, and the entirety of which is incorporated herein by reference for correction of incorrect translation.

What is claimed is:

1. A print apparatus, comprising:
    a communication circuit that communicates with an external device via a network; and
    an information reporting processor that prepares a file indicating a predetermined situation to be reported, by using information having a predetermined format that can be displayed by a filer, and stores the file in a storing area so as to have a file format that enables the file to be browsed by the external device via the network,
    wherein the information reporting processor sets an attribute of the file to a value for prohibiting the file from being deleted or a value for prohibiting the information from being changed by the external device.

2. The print apparatus of claim 1, wherein the information having the predetermined format includes at least one of a file name of the file, an extension of the file and an image included in an image file.

3. The print apparatus of claim 1, wherein the situation to be reported includes at least one of a situation of the print apparatus, a situation of a reception of the print data and a status of a print job which is executed by the print apparatus.

4. The print apparatus of claim 1, wherein in case that after the information reporting processor prepares the file corresponding to one situation to be reported, the one situation to be reported is changed, the information reporting processor updates the information of the file having the predetermined format so as to display the changed one situation to be reported.

5. A print apparatus, comprising:
    a communication circuit that communicates with an external device via a network; and
    an information reporting processor that prepares a file indicating a predetermined situation to be reported, by using information having a predetermined format that can be displayed by a filer, and stores the file in a storing area so as to have a file format that enables the file to be browsed by the external device via the network,
    wherein in case that the file stored in the storing area is deleted by the external device, the information reporting processor recovers the deleted file in the storing area.

6. A non-transitory computer readable medium comprising computer readable program code for:
    communicating with an external device via a network,
    preparing a file indicating a predetermined situation to be reported, by using information having a predetermined format that can be displayed by a filer, storing the file in a storing area that can be browsed by the external device via the network, and setting an attribute of the file to a value for prohibiting the file from being deleted or a value for prohibiting the information from being changed by the external device.

7. The non-transitory computer readable medium of claim 6, wherein the information having the predetermined format includes at least one of a file name of the file, an extension of the file and an image included in an image file.

8. The non-transitory computer readable medium of claim 6, wherein the situation to be reported includes at least one of a situation of a print apparatus, a situation of a reception of the print data, and a status of a print job that is executed by the print apparatus.

9. The non-transitory computer readable medium of claim 6, the non-transitory computer readable medium further comprises computer readable program code for:

updating the information of the file having the predetermined format so as to display the changed one situation to be reported in a case that after the file corresponding to one situation to be reported is prepared, the one situation to be reported is changed.

10. A non-transitory computer readable medium comprising computer readable program code for:

communicating with an external device via a network, preparing a file indicating a predetermined situation to be reported, by using information having a predetermined format that can be displayed by a filer, storing the file in a storing area that can be browsed by the external device via the network, and recovering the deleted file in the storing area in a case that the file stored in the storing area is deleted by the external device.

* * * * *